(12) United States Patent
Miyamoto et al.

(10) Patent No.: US 7,511,114 B2
(45) Date of Patent: Mar. 31, 2009

(54) COLORED AROMATIC POLYCARBONATE RESIN COMPOSITION, PROCESS FOR PRODUCING THE SAME AND COLORED HOLLOW CONTAINER

(75) Inventors: Masaaki Miyamoto, Kitakyushu (JP); Takao Tayama, Kitakyushu (JP); Kiyoji Kuma, Kitakyushu (JP); Eiji Fujimoto, Kitakyushu (JP)

(73) Assignee: Mitsubishi Chemical Corporation, Tokyo (JP)

( * ) Notice: Subject to any disclaimer, the term of this patent is extended or adjusted under 35 U.S.C. 154(b) by 125 days.

(21) Appl. No.: 11/604,904

(22) Filed: Nov. 28, 2006

(65) Prior Publication Data

US 2007/0129471 A1    Jun. 7, 2007

Related U.S. Application Data

(63) Continuation-in-part of application No. PCT/JP2005/012360, filed on Jul. 5, 2005.

(30) Foreign Application Priority Data

Jul. 6, 2004    (JP)    ............. 2004-199841

(51) Int. Cl.
C08G 64/00    (2006.01)
C08G 63/02    (2006.01)

(52) U.S. Cl. .................. 528/196; 428/34.1; 428/35.7; 528/164; 528/176; 528/193; 528/198

(58) Field of Classification Search ........ 428/34.1, 428/35.7; 528/164, 176, 193, 196, 198
See application file for complete search history.

(56) References Cited

U.S. PATENT DOCUMENTS 7,084,233 B2    8/2006    Miyamoto et al.
2004/0260049 A1    12/2004    Miyamoto et al.

FOREIGN PATENT DOCUMENTS

EP    1 500 671 A    1/2005
JP    57 192458 A    11/1982
JP    05-117516    5/1993
WO    WO 03/089495 A    10/2003

OTHER PUBLICATIONS

Database CA, Chemical Abstracts Service, Columbus, Ohio; "Coloring of ppolycarbonates", XP002474141 retrieved from STN Database accession No. 98:180474.

Primary Examiner—Terressa M Boykin
(74) Attorney, Agent, or Firm—Nixon & Vanderhye P.C.

(57) ABSTRACT

Colored aromatic polycarbonate resin compositions are prepared by dispersing a colorant (b) selected from phthalocyanine-based compounds, anthraquinone-based compounds and ultramarine blue in a polyalkyleneglycol compound (c) having a number-average molecular weight of 62 to 4000 of formula (2):

$$HO-[-CHR^1-CHR^2-]_m-OH \qquad (2)$$

where $R^1$, $R^2$, $R^3$ and $R^4$ are independently hydrogen atoms or alkyl groups, and m is not less than 1. The dispersion is added to an aromatic polycarbonate resin (a) kept in a molten state which has a viscosity-average molecular weight of not less than 16000 and contains a branched constitutional unit of formula (1):

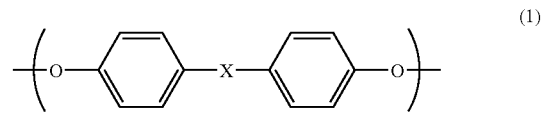

in an amount of 0.3 to 0.95 mol % where X is a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, or a divalent connecting group —O—, —S—, —CO—, —SO— and —$SO_2$—.

8 Claims, No Drawings

COLORED AROMATIC POLYCARBONATE RESIN COMPOSITION, PROCESS FOR PRODUCING THE SAME AND COLORED HOLLOW CONTAINER

CROSS REFERENCES TO RELATED APPLICATIONS

This is a continuation-in-part application of International Application No. PCT/JP2005/012360, filed 5 Jul. 2005, which designated the US and claims benefit of JP 2004-199841, filed 6 Jul. 2004, the entire contents of each of which are hereby incorporated by reference.

BACKGROUND OF THE INVENTION

The present invention relates to a colored aromatic polycarbonate resin composition, a process for producing the same, and a colored hollow container. More particularly, the present invention relates to a colored aromatic polycarbonate resin composition which exhibits an excellent hue, and is improved in heat resistance and hydrolysis resistance, a process for producing the colored aromatic polycarbonate resin composition, and a colored hollow container using the colored aromatic polycarbonate resin composition.

Aromatic polycarbonate resins have been extensively used in various applications such as optical disks, OA apparatuses, medical parts and food containers because these resins are excellent in heat resistance, mechanical properties such as impact resistance and dimensional stability as well as transparency. In particular, in the application field of food containers, the aromatic polycarbonate resins are blended with a larger amount of pigments or dyes than that used ordinarily to form a colored container. Upon coloring these resins, if the colorants are poorly dispersed in the resins, the resultant container tends to suffer from unevenness of hue.

To enhance a dispersibility of the pigments or dyes in the aromatic polycarbonate resin, these components may be forcibly kneaded together using an extruder. However, in such a case, there tends to be caused such a problem that a part of the aromatic polycarbonate resin is colored due to thermal decomposition, and a molecular weight of the resin is decreased, thereby failing to attain an aimed melt viscosity thereof. In addition, the obtained aromatic polycarbonate resin composition tends to be deteriorated in heat resistance and hydrolysis resistance. In particular, in the case of blow-molded food containers, contour-molded products, twin-wall sheet molded products or multi-wall sheet molded products, aromatic polycarbonate resins used therefor are required to have a large molecular weight or contain a large amount of branched constitutional units, i.e., exhibit a high melt tension. Therefore, the above problems tend to become more remarkable when the aromatic polycarbonate resins are used in these molded products.

To solve these problems, there is known a method of producing a colored aromatic polycarbonate resin composition by adding a polyalkyleneglycol derivative represented by the general formula: $R^2COO-(CH_2-CHR^1-O)_m-R^3$ (wherein $R^1$ is a hydrogen atom or a lower alkyl group, $R^2$ is an alkyl group having 1 to 30 carbon atoms or a phenyl group substituted with 0 to 2 lower alkyl groups, $R^3$ is a hydrogen atom or an acyl group having 1 to 30 carbon atoms; and m is an integer of 1 to 1000), together with an anthraquinone-based dye, to an aromatic polycarbonate resin (Japanese Patent Application Laid-Open (KOKAI) No. 5-117516 (1993)).

The above polyalkyleneglycol derivative exhibits a certain degree of color-development promoting effect when used together with the aromatic polycarbonate resin having a small molecular weight or containing a less amount of branched constitutional units. However, when used together with the aromatic polycarbonate resin having a large molecular weight or containing a large amount of branched constitutional units (i.e., aromatic polycarbonate resin having a high melt tension), the color-development promoting effect of the polyalkyleneglycol derivative is insufficient.

SUMMARY OF THE INVENTION

The present invention has been conducted to solve the above problems. An object of the present invention is to provide a colored aromatic polycarbonate resin composition containing an aromatic polycarbonate resin having a high melt tension, which is free from unevenness of hue and exhibits a good heat resistance and a good hydrolysis resistance, a process for producing such composition, and a colored hollow container using such composition.

As a result of the present inventors' earnest study, it has been found that the above object of the present invention can be readily accomplished by the colored aromatic polycarbonate resin composition produced by using a polyalkyleneglycol derivative having a different structure from that of the above polyalkyleneglycol derivative described in the prior art. The present invention has been attained on the basis of this finding.

To accomplish the aim, in a first aspect of the present invention, there is provided a colored aromatic polycarbonate resin composition comprising:

100 parts by weight of an aromatic polycarbonate resin (a) having a viscosity-average molecular weight of not less than 16000 and containing a branched constitutional unit in an amount of 0.3 to 0.95 mol % on the basis of a constitutional unit represented by the general formula (1):

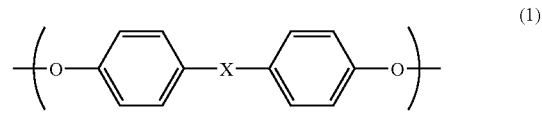

(1)

(wherein X is a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, or a divalent connecting group selected from the group consisting of —O—, —S—, —CO—, —SO— and —SO$_2$—);

0.00001 to 0.05 part by weight of at least one colorant (b) selected from the group consisting of phthalocyanine-based compounds, anthraquinone-based compounds and ultramarine blue; and 0.0001 to 0.5 part by weight of a polyalkyleneglycol compound (c) having a number-average molecular weight of 62 to 4000, which is represented by the general formula (2):

(2)

(wherein $R^1$, $R^2$, $R^3$ and $R^4$ are independently a hydrogen atom or an alkyl group, and m is a natural number of not less than 1).

In a second aspect of the present invention, there is provided a hollow container produced by blow-molding the above colored aromatic polycarbonate resin composition.

In a third aspect of the present invention, there is provided a process for producing the above colored aromatic polycarbonate resin composition, which process comprises:

dispersing at least one colorant (b) selected from the group consisting of phthalocyanine-based compounds, anthraquinone-based compounds and ultramarine blue in the polyalkyleneglycol compound (c) having a number-average molecular weight of 62 to 4000, which polyalkyleneglycol compound is represented by the general formula (2):

$$HO-[-CHR^1-CHR^2-]_m-OH \quad (2)$$

(wherein $R^1$, $R^2$, $R^3$ and $R^4$ are independently a hydrogen atom or an alkyl group, and m is a natural number of not less than 1); and adding the resultant dispersion to the aromatic polycarbonate resin (a) retained in a molten state.

DETAILED DESCRIPTION OF THE INVENTION

The present invention is described in detail below. However, the following descriptions are concerned with typical examples of the present invention, and therefore the present invention is not limited thereto. Meanwhile, the aromatic polycarbonate resin is hereinafter referred to simply as "PC resin".

The PC resin used in the present invention may be produced by an interfacial method in which an aromatic dihydroxy compound is reacted with phosgene, or a transesterification method (melting method) in which the aromatic dihydroxy compound is reacted with a carbonic diester such as diphenyl carbonate.

The aromatic dihydroxy compound used in the present invention is a compound containing two aromatic hydroxyl groups in a molecule thereof, which is preferably represented by the following general formula (7):

(7)

(wherein X is a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, or a divalent connecting group selected from the group consisting of —O—, —S—, —CO—, —SO— and —SO$_2$—).

Examples of the aromatic dihydroxy compound represented by the general formula (7) may include bis(4-hydroxydiphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis(4-hydroxy-3,5-dibromophenyl)propane, 4,4-bis(4-hydroxyphenyl)heptane, 1,1-bis(4-hydroxyphenyl)cyclohexane, 4,4'-dihydroxybiphenyl, 3,3',5,5'-tetramethyl-4,4'-dihydroxybiphenyl, bis(4-hydroxyphenyl)sulfone, bis(4-hydroxyphenyl)sulfide, bis(4-hydroxyphenyl)ether and bis(4-hydroxyphenyl)ketone. Among these aromatic dihydroxy compounds, preferred is 2,2-bis(4-hydroxyphenyl)propane (hereinafter referred to merely as "bisphenol A"). These aromatic dihydroxy compounds may be used in combination of any two or more thereof.

The PC resin may be specifically produced by the following interfacial method. That is, in the presence of an inert solvent such as methylene chloride and 1,2-dichloromethane, at least one aromatic dihydroxy compound is blended with an aqueous alkali solution or pyridine as an acid receptor, and reacted while introducing phosgene thereinto. When the aqueous alkali solution is used as an acid receptor, as a catalyst, there may be used tertiary amines such as trimethylamine and triethylamine, or quaternary ammonium compounds such as tetrabutylammonium chloride and benzyltributylammonium bromide for the purpose of increasing the reaction rate. Also, if required, as a molecular weight modifier, there may coexist monovalent phenols such as phenol and p-tert-butyl phenol. The reaction temperature is usually from 0 to 100° C. The catalyst may be used from initiation of the reaction, or may be added, after completing production of oligomers, to polymerize the oligomers.

Further, in order to produce the branched PC resin, as a branching agent, there may be used polyhydroxy compounds such as phloroglucin, 2,6-dimethyl-2,4,6-tri(4-hydroxyphenyl)hepten-3, 4,6-dimethyl-2,4,6-tri(4-hydroxyphenyl)hepten-2, 1,3,5-tri(2-hydroxyphenyl)benzene, 1,1,1-tri(4-hydroxyphenyl)ethane, 2,6-bis(2-hydroxy-5-methylbenzyl)-4-methylphenol and α,α',α"-tri(4-hydroxyphenyl)-1,3,5-triisopropylbenzene, as well as 3,3-bis(4-hydroxyaryl) oxyindole (=isatin bisphenol), 5-chloroisatin, 5,7-dichloroisatin and 5-bromoisatin.

Further, in the transesterification method in which the aromatic dihydroxy compound is reacted with a carbonic diester, as the carbonic diester, there may be used compounds which are usually represented by the following general formula (8):

(8)

(wherein A and A' are respectively an unsubstituted or substituted aliphatic group having 1 to 18 carbon atoms or an unsubstituted or substituted aromatic group, and A and A' may be the same or different).

Examples of the carbonic diester represented by the general formula (8) may include dialkyl carbonate compounds such as dimethyl carbonate, diethyl carbonate and di-tert-butyl carbonate; diphenyl carbonate; and substituted diphenyl carbonates such as ditolyl carbonate. Among these carbonic diesters, preferred are diphenyl carbonate and substituted diphenyl carbonates, and more preferred is diphenyl carbonate. These diphenyl carbonates may be used in combination of any two or more thereof.

When the PC resin is produced by the transesterification method, as raw materials, there may be usually used bisphenol A and diphenyl carbonate. The amount of diphenyl carbonate used in the reaction is usually from 1.01 to 1.30 mole, preferably from 1.02 to 1.20 mole based on one mole of bisphenol A. When the molar ratio of diphenyl carbonate to bisphenol A is less than 1.01, the amount of end OH groups contained in the PC resin produced tends to be increased, resulting in poor heat stability of the resultant polymer. When the molar ratio of diphenyl carbonate to bisphenol A is more than 1.30, the transesterification reaction rate tends to be lowered, so that it may be difficult to produce the PC resin having the aimed molecular weight.

In the transesterification method, there may be used a transesterification catalyst. Examples of the transesterification catalyst may include basic compounds such as alkali metal compounds, alkali earth metal compounds, basic boron compounds, basic phosphorus compounds, basic ammonium compounds and amine-based compounds. Among these transesterification catalysts, alkali metal compounds and/or alkali earth metal compounds are preferred from the standpoints of good handling property and excellent properties of the resultant resins.

The amount of the transesterification catalyst used is usually from $1 \times 10^{-8}$ to $5 \times 10^{-6}$ mole, preferably from $1 \times 10^{-7}$ to $3 \times 10^{-6}$ mole, more preferably from $2 \times 10^{-7}$ to $3 \times 10^{-6}$ mole based on one mole of the aromatic dihydroxy compound. When the amount of the transesterification catalyst used is less than the above-specified range, it may be difficult to attain a polymerization activity required for producing the PC resin having the aimed molecular weight and containing the aimed amount of end hydroxy groups. When the amount of the transesterification catalyst used is more than the above-specified range, the resultant polymer tends to be deteriorated in hue as well as heat stability and hydrolysis resistance.

Examples of the alkali metal compounds may include sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium boron hydride, potassium boron hydride, lithium boron hydride, cesium boron hydride, sodium boron pheneylate, potassium boron pheneylate, lithium boron pheneylate, cesium boron pheneylate, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenyl phosphate, dipotassium phenyl phosphate, dilithium phenyl phosphate, dicesium phenyl phosphate, alcoholates and phenolates of sodium, potassium, lithium and cesium, and disodium salts, dipotassium salts, dilithium salts and dicesium salts of bisphenol A.

Examples of the alkali earth metal compounds may include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate.

Examples of the basic boron compounds may include sodium salts, potassium salts, lithium salts, calcium salts, barium salts, magnesium salts and strontium salts of tetramethyl boron, tetraethyl boron, tetrapropyl boron, tetrabutyl boron, trimethylethyl boron, trimethylbenzyl boron, trimethylphenyl boron, triethylmethyl boron, triethylbenzyl boron, triethylphenyl boron, tributylbenzyl boron, tributylphenyl boron, tetraphenyl boron, benzyltriphenyl boron, methyltriphenyl boron and butyltriphenyl boron.

Examples of the basic phosphorus compounds may include triethyl phosphine, tri-n-propyl phosphine, triisopropyl phosphine, tri-n-butyl phosphine, triphenyl phosphine, tributyl phosphine and quaternary phosphonium salts.

Examples of the basic ammonium compounds may include tetramethyl ammonium hydroxide, tetraethyl ammonium hydroxide, tetrapropyl ammonium hydroxide, tetrabutyl ammonium hydroxide, trimethylethyl ammonium hydroxide, trimethylbenzyl ammonium hydroxide, trimethylphenyl ammonium hydroxide, triethylmethyl ammonium hydroxide, triethylbenzyl ammonium hydroxide, triethylphenyl ammonium hydroxide, tributylbenzyl ammonium hydroxide, tributylphenyl ammonium hydroxide, tetraphenyl ammonium hydroxide, benzyltriphenyl ammonium hydroxide, methyltriphenyl ammonium hydroxide and butyltriphenyl ammonium hydroxide.

Examples of the amine-based compounds may include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methyl imidazole and aminoquinoline.

In general, the transesterification reaction is conducted in multi-stage process including two or more reaction stages. More specifically, the first stage reaction is conducted under reduced pressure at a temperature of usually 120 to 260° C., preferably 180 to 240° C. for usually 0.1 to 5 hours, preferably 0.1 to 3 hours. Then, while increasing the vacuum degree of the reaction system, the polycondensation reaction is finally conducted under a reduced pressure of not more than 133 Pa at a temperature of 240 to 320° C. The reaction method may be any of a batch method, a continuous method and combination of the batch and continuous methods. Also, the reaction apparatus used may be any of a vessel-type reactor, a tube-type reactor and a column-type reactor.

The PC resin (a) used in the present invention has a viscosity-average molecular weight of usually not less than 16000, preferably not less than 20000. The PC resin having a viscosity-average molecular weight less than 16000 tends to be deteriorated in mechanical properties such as impact resistance.

Meanwhile, the PC resin having a viscosity-average molecular weight of not less than 16000 tends to exhibit an increased melt viscosity and, therefore, tends to be deteriorated in dispersion of colorants therein. In accordance with the present invention, since a specific amount of the below-mentioned specific polyalkyleneglycol compound is added to the PC resin, the colorants can be suitably dispersed in the PC resin.

The PC resin (a) used in the present invention contains end OH groups in an amount of usually 100 to 1500 ppm, preferably 150 to 1200 ppm, more preferably 200 to 1000 ppm in order to allow the resultant products to maintain practically useful properties such as heat stability, hydrolysis resistance and hue.

The PC resin (a) used in the present invention contains a branched constitutional unit. The molar percentage of the branched constitutional unit on the basis of the constitutional unit represented by the general formula (1) is from 0.3 to 0.95 mol %, preferably from 0.3 to 0.90 mol %, more preferably 0.3 to 0.80 mol %. When the above molar percentage of the branched constitutional unit is satisfied, the resultant composition exhibits a high melt tension as well as a good blow-moldability and a good extrusion-moldability. When the molar percentage of the branched constitutional unit is more than the above-specified range, the melt tension of the resultant composition tends to be too high, resulting in poor fluidity and thereby failing to exhibit the aimed melt properties.

As described above, the PC resin containing the branched constitutional unit tends to exhibit an increased melt viscosity and, therefore, tends to be deteriorated in dispersion of colorants therein. In accordance with the present invention, since a specific amount of the below-mentioned specific polyalkyleneglycol compound is added to the PC resin, the colorants can be suitably dispersed in the PC resin.

Typical examples of the branched constitutional unit may include such structures represented by the following general formulae (3) to (6):

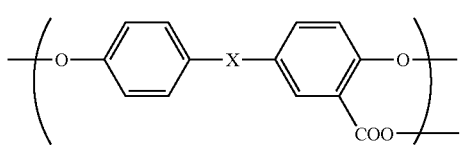

(3)

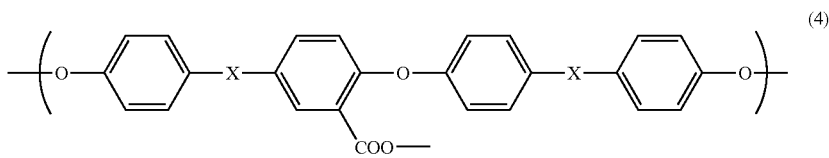

(4)

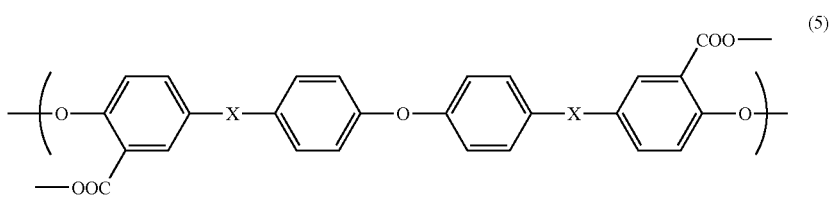

(5)

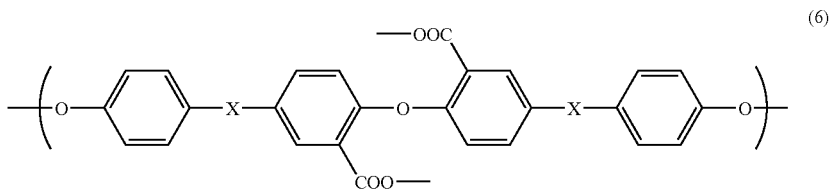

(6)

(wherein X is a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, or a divalent connecting group selected from the group consisting of —O—, —S—, —CO—, —SO— and —SO$_2$—).

As to the branched constitutional units represented by the general formulae (3) and (4), it is conventionally known that in the process for producing PC resins by a melting method (transesterification method) using the aromatic dihydroxy compound represented by the general formula (7), these branched constitutional units are produced by rearrangement reaction simultaneously caused in the polymerization reaction system (for example, refer to "Encyclopedia of Polymer Science and Technology", vol. 10, p. 723 (1969)). On the other hand, the branched constitutional units represented by the general formulae (5) and (6) have been first found by the present inventors. It is suggested that these branched constitutional units are produced through the following reaction scheme upon producing PC by the melting method under specific conditions:

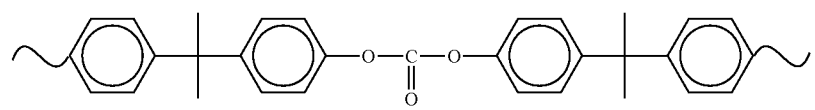
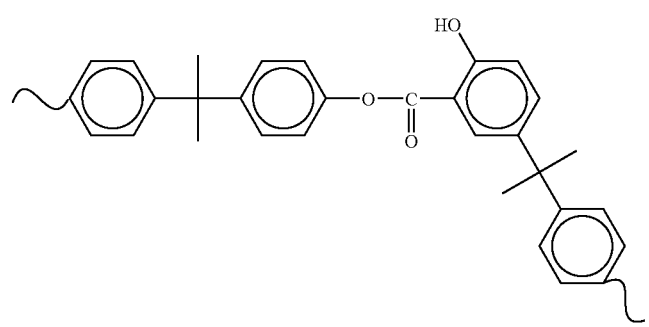
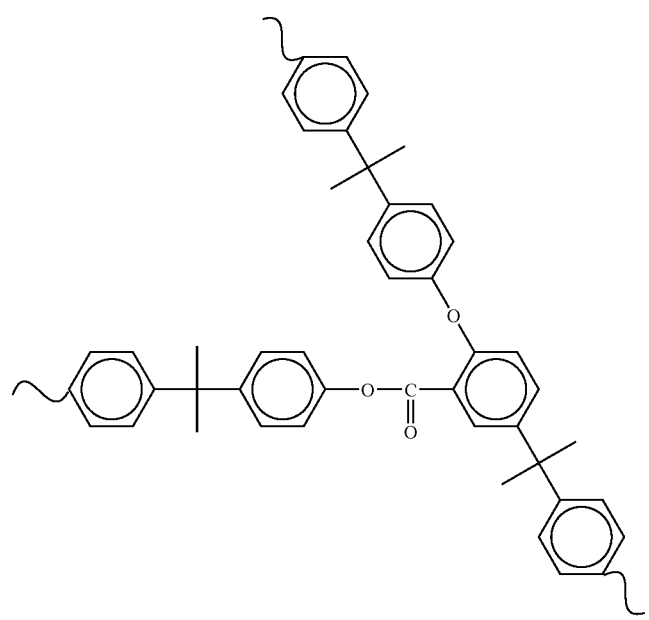

-continued

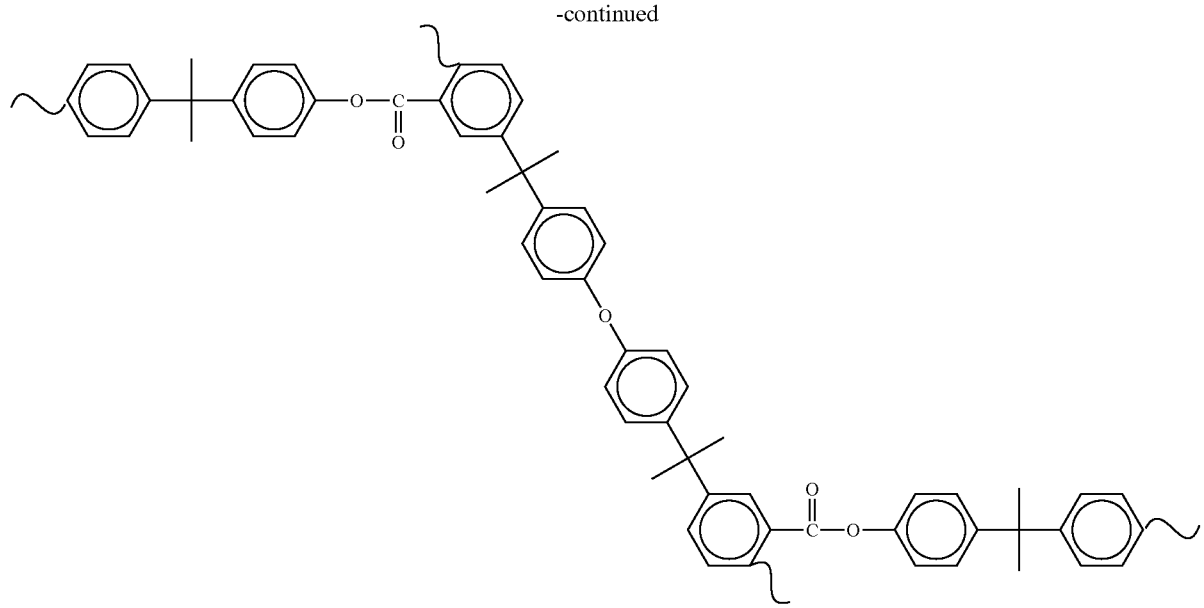

+

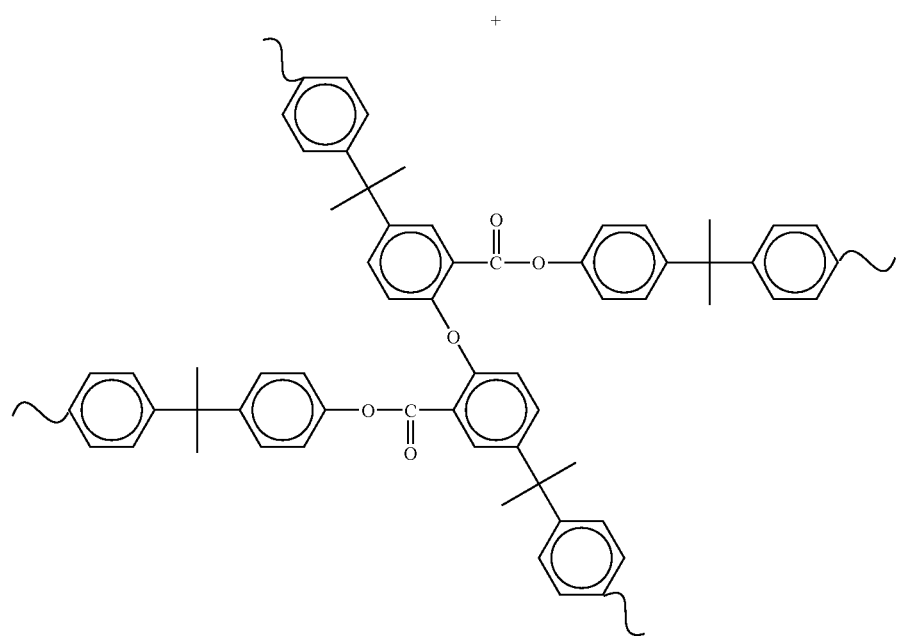

Thus, since it is considered that the branched constitutional units represented by the general formulae (5) and (6) are produced through the constitutional units represented by the general formulae (3) and (4), the amounts of the branched constitutional units represented by the general formulae (5) and (6) produced are smaller than those of the constitutional units represented by the general formulae (3) and (4) produced. However, the branched constitutional units represented by the general formulae (5) and (6) are important to obtain branched PC resins having aimed excellent melting properties.

The amount of the respective branched constitutional units can be readily determined by subjecting the thus produced PC resin to alkali hydrolysis and then high-pressure liquid chromatography (HPLC), gel permeation chromatography (GPC), etc. For example, in the case where bisphenol A is used as the aromatic dihydroxy compound, when being subjected to the high-pressure liquid chromatography (HPLC), etc., after the alkali hydrolysis, the branched constitutional units are detected as respective compounds represented by the following formulae (9) to (13). Therefore, quantities of the respective compounds may be determined from an absorption coefficient of each standard substance thereof. More specifically, using the standard substances of the respective compounds, a calibration curve for concentration and peak area thereof is prepared. From the thus prepared calibration curve, the contents of the respective compounds can be determined.

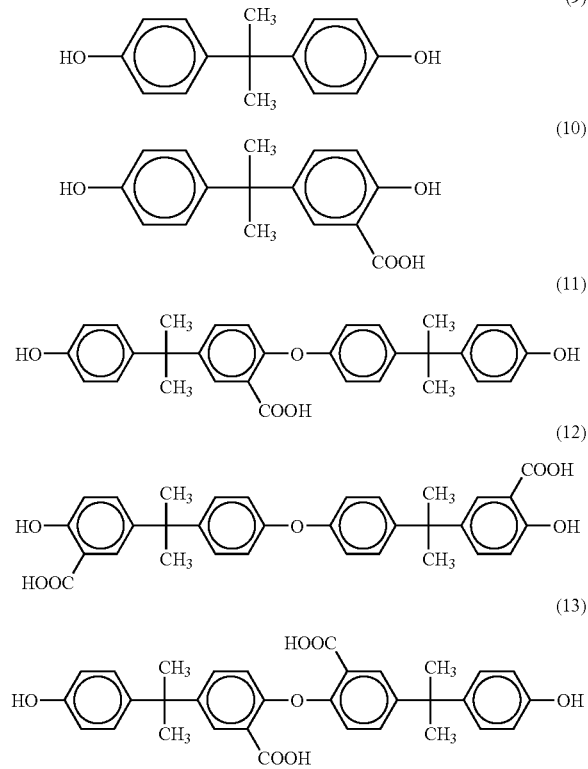

The molar percentage of the branched constitutional unit represented by the general formula (5) on the basis of the constitutional unit represented by the general formula (1) is usually from 0.0002 to 0.15 mol %, preferably from 0.0003 to 0.12 mol %. Also, the molar percentage of the branched constitutional unit represented by the general formula (6) on the basis of the constitutional unit represented by the general formula (1) is usually from 0.0002 to 0.15 mol %, preferably from 0.0003 to 0.12 mol %.

In the PC resin (a) used in the present invention, the ratio (Mw/Mn) of a weight-average molecular weight (Mw) to a number-average molecular weight (Mn) thereof is usually from 2.8 to 4.0, preferably from 2.8 to 3.8, more preferably from 2.8 to 3.6 as calculated in terms of polystyrene measured by gel permeation chromatography. The PC resins having a ratio (Mw/Mn) of from 2.8 to 4.0 exhibit a relatively broad molecular weight distribution and a good moldability.

The colorant (b) used in the present invention may be at least one compound selected from the group consisting of phthalocyanine-based compounds, anthraquinone-based compounds and ultramarine blue.

Examples of the phthalocyanine-based compounds may include phthalocyanine blue "Pigment Blue 15:3" (C.I. Generic Name). Examples of the anthraquinone-based compounds may include blue or violet dyes such as "Solvent Blue 97", "Solvent Violet 36" and "Solvent Violet 13" (all are C.I. Generic Names).

The polyalkyleneglycol compound (c) used in the present invention has a number-average molecular weight of 62 to 4000, and is such a compound having hydroxyl groups at both terminal ends thereof, which is represented by the general formula (2):

$$HO-[-CHR^1-CHR^2-]_m-OH \quad (2)$$

(wherein $R^1$, $R^2$, $R^3$ and $R^4$ are independently a hydrogen atom or an alkyl group; and m is a natural number of not less than 1).

The polyalkyleneglycol compound (c) exhibits a function as a dispersant for dispersing the colorant (b) in the PC resin (a). The reason why the polyalkyleneglycol compound (c) exhibits the function as a dispersant is considered to be that the polyalkyleneglycol compound (c) exhibits a very high affinity to the PC resin (a), though not clearly known. The polyalkyleneglycol compound (c) has a number-average molecular weight of from 62 to 4000, preferably from 100 to 3000, more preferably from 200 to 3000. When the number-average molecular weight of the polyalkyleneglycol compound (c) is more than 4000, the polyalkyleneglycol compound may fail to exhibit a sufficient function as a dispersant for the colorant (c).

Specific examples of the polyalkyleneglycol compound (c) may include polyethyleneglycol, polypropyleneglycol, poly(ethyleneglycol-tetramethyleneglycol) and polyethyleneglycol-polypropyleneglycol. Among these polyalkyleneglycol compounds, preferred are polyethyleneglycol and polypropyleneglycol, and more preferred is polyethyleneglycol. These polyalkyleneglycol compounds (c) may be used in combination of any two or more thereof.

The colored PC resin composition of the present invention comprises the PC resin (a), the colorant (b) and the polyalkyleneglycol compound (c) as essential components. Further, in the preferred embodiment of the present invention, the composition further contains a heat stabilizer (d).

The heat stabilizer (d) may be used, for example, upon injection-molding process for the purpose of imparting a good heat stability to the PC resin composition. The heat stabilizer (d) is preferably a phosphorus compound, though not particularly limited thereto. As the phosphorus compound, there may be suitably used phosphorous ester derivatives of which at least one ester is substituted with phenol and/or phenol having at least one alkyl group having 1 to 25 carbon atoms, or phosphonites.

Examples of the phosphorous ester derivatives may include 4,4'-butylidene-bis(3-methyl-6-t-butylphenyl-ditridecyl)phosphite, 1,1,3-tris(2-methyl-4-ditridecyl phosphite-5-t-butylphenyl)butane, trisnonylphenyl phosphite, dinonylphenyl pentaerythritol diphosphite, tris(2,4-di-t-butylphenyl)phosphite, bis(2,4-di-t-butylphenyl)pentaerythritol diphosphite, di(2,6-di-t-butyl-4-methylphenyl)pentaerythritol diphosphite, 2,2'-ethylidene-bis(4,6-di-t-butylphenyl)fluoride phosphite, 2,2'-methylene-bis(4,6-di-t-butylphenyl)octyl phosphite, bis(2,4-dicumylphenyl) pentaerythritol diphosphite, and phosphorous esters produced from mononyl phenol and dinonyl phenol. Examples of the phosphonites may include tetrakis(2,4-di-t-butylphenyl)-4,4'-biphenylene-diphosphonite, etc. Among these heat stabilizers, preferred are tris(2,4-di-t-butylphenyl) phosphite, 2,2'-methylene-bis(4,6-di-t-butylphenyl)octyl phosphite and tetrakis(2,4-di-t-butylphenyl)-4,4'-biphenylene-diphosphonite.

In the colored PC resin composition of the present invention, the contents of the respective components based on 100 parts by weight of the PC resin (a), are as follows.

The content of the colorant (b) is from 0.00001 to 0.05 part by weight, preferably from 0.00005 to 0.01 part by weight.

When the content of the colorant (b) is less than 0.00001 part by weight, the resultant composition tends to be insufficient in coloration. When the content of the colorant (b) is more than 0.05 part by weight, the use of such a large amount of the colorant tends to become economically disadvantageous.

The content of the polyalkyleneglycol compound (c) is from 0.0001 to 0.5 part by weight, preferably from 0.01 to 0.3 part by weight, more preferably from 0.01 to 0.1 part by weight. When the content of the polyalkyleneglycol compound (c) is less than 0.0001 part by weight, the colorant (b) may fail to be well dispersed in the PC resin. When the content of the polyalkyleneglycol compound (c) is more than 0.5 part by weight, the resultant composition tends to be deteriorated in hydrolysis resistance.

The content of the heat stabilizer (d) is usually from 0.0001 to 0.5 part by weight, preferably from 0.0001 to 0.4 part by weight. When the content of the heat stabilizer (d) is less than 0.0001 part by weight, it may be difficult to exhibit a sufficient heat stabilization effect. When the content of the heat stabilizer (d) is more than 0.5 part by weight, the resultant composition tends to be deteriorated in hydrolysis resistance, etc.

Meanwhile, the colored polycarbonate resin composition of the present invention may also be blended with other resins and various additives such as release agents, UV absorbers, reinforcing agents, fillers, antioxidants, weather-resisting agents, lubricants, nucleating agents, plasticizers and fluidity modifiers upon mixing or molding thereof, unless the addition thereof adversely affect properties of the resultant composition.

Next, the process for producing the colored PC resin composition according to the present invention is explained. The production process of the present invention comprises: dispersing at least one colorant (b) selected from the group consisting of phthalocyanine-based compounds, anthraquinone-based compounds and ultramarine blue in the polyalkyleneglycol compound (c) having a number-average molecular weight of 62 to 4000, which polyalkyleneglycol compound is represented by the above general formula (2); and then adding the resultant dispersion to the aromatic PC resin (a) retainedt in a molten state.

The "addition of the dispersion to the PC resin (a) retained in a molten state" means that the dispersion is added before pelletizing the PC resin and at any stage (1) during the polymerization reaction, (2) upon completion of the polymerization reaction and after deactivation of the catalyst used in the polymerization reaction (after adding a deactivator). In accordance with the production process of the present invention, the colorant can be well dispersed in the PC resin, and the aromatic polycarbonate resin can be prevented from suffering from heat decomposition (discoloration). As a result, it is possible to obtain a colored aromatic polycarbonate resin composition which is free from uneven color or dull color. Meanwhile, the method for addition of the heat stabilizer (d) and other additives is not particularly limited, and there may be conveniently used such an addition method in which the heat stabilizer (d) and other additives are dispersed together with the colorant (b) in the polyalkyleneglycol compound (c).

Next, the colored hollow container of the present invention is explained. The colored hollow container of the present invention is produced by blow-molding the colored PC resin composition of the present invention.

As the blow-molding method, there may be used a direct blow-molding method, an injection blow-molding method and an injection stretch blow-molding method. For example, in the case of the direct blow-molding method, pellets of the colored PC resin composition are fed into a single-screw or twin-screw extruder maintained at a cylinder set temperature of 240 to 270° C., melted and kneaded therein under shearing by screws, and then extruded into a tubular molten parison through a nozzle. Thereafter, the thus extruded parison is placed in a mold with a desired cavity shape which is maintained at a temperature of 20 to 110° C., and then formed into a hollow container (food container) by blowing air or an inert gas thereinto. For example, bottles for dairy products, beverages or water may also be produced by biaxailly stretching blow-molding method as described in Japanese Patent Application Laid-Open (KOKAI) No. 6-122145(1994), etc. Also, from the standpoint of improved gas-barrier property, the composition of the present invention together with other resins such as polyethylene terephthalate and polyamides, may be subjected to multi-layer blow-molding method to form a laminated bottle.

The thickness of the colored hollow container of the present invention is not particularly limited, and is usually from 0.1 to 7 mm, preferably from 0.2 to 5 mm, more preferably from 0.3 to 3 mm from the standpoints of good strength and shape retention of the hollow container. The colored hollow container of the present invention may be used in various applications, in particular, is suitably used as bottles for dairy products, beverages and water.

In accordance with the present invention, there are provided an aromatic polycarbonate resin composition using an aromatic polycarbonate resin having a high melt tension, which is free from unevenness of hue and exhibits a good heat resistance and a good hydrolysis resistance; a process for producing the colored aromatic polycarbonate resin composition; and a colored hollow container using the aromatic polycarbonate resin composition.

EXAMPLES

The present invention is described in more detail by Examples, but the Examples are only illustrative and not intended to limit the scope of the present invention. Meanwhile, in the following Examples and Comparative Examples, various properties of the PC resin compositions were measured and evaluated by the following methods.

(1) Viscosity-Average Molecular Weight (Mv):

The intrinsic viscosity of a 6 g/L methylene chloride solution of the respective PC resins was measured using an Ubbelohde viscometer. The viscosity-average molecular weight of the resin was calculated from the thus measured intrinsic viscosity value according to the following formula:

$$[\eta]=1.23\times10^{-4}\times(Mv)^{0.83}$$

(2) Branching Degree:

The branching degree of the PC resin was expressed by the ratio (mol %) of total moles of the branched constitutional units represented by the general formulae (3) to (6) based on one mole of the constitutional unit represented by the general formula (1). More specifically, the contents of the respective constitutional units were determined by the following method. Further, the branching degree was calculated from the ratio (mol %) of total moles of the branched constitutional units represented by the general formulae (10) to (13) based on one mole of the constitutional unit represented by the general formula (9).

One gram of the PC resin (sample) was dissolved in 100 mL of methylene chloride. The obtained solution was mixed with 18 mL of a 28% methanol solution of sodium methoxide and 80 mL of methanol and then with 25 mL of pure water, and the resultant mixed solution was stirred at room temperature for 2 hours to completely hydrolyze the PC resin. Thereafter, the obtained reaction mixture was neutralized by adding 1N hydrochloric acid thereto, and the obtained methylene chloride layer was separated therefrom to obtain a hydrolyzed product.

0.05 g of the resultant hydrolyzed product was dissolved in 10 mL of acetonitrile, and subjected to a reversed-phase high-pressure liquid chromatography (HPLC). In the reversed-phase high-pressure liquid chromatography, using as an eluant a mixed solvent composed of acetonitrile and a 10 mM ammonium acetate aqueous solution, the measurement was conducted at a column temperature of 40° C. under such a gradient condition in which the ratio of acetonitrile to the 10 mM ammonium acetate aqueous solution in the mixed solvent was varied from 20:80 at the beginning up to 80:20 finally. The detection was performed using an UV detector "SPD-6A" manufactured by Shimadzu Seisakusho Co., Ltd., at a detection wavelength of 280 nm.

Since the constitutional units represented by the formulae (3) to (6) were respectively detected as the compounds represented by the formulae (9) to (13), the identification thereof was conducted using "LC-MS (Agilent-1100)" manufactured by Agilent Co., Ltd., and "NMR(AL-400)" manufactured by Nippon Denshi Co., Ltd. The contents of the respective constitutional units were determined from a calibration curve for concentration and peak area prepared using standard substances of the respective compounds.

(3) Weight-Average Molecular Weight (Mw), Number-Average Molecular Weight (Mn) and Mw/Mn:

The measurement was conducted using an analyzer "HLC-8020" manufactured by Toso Co., Ltd., which was connected with four columns (diameter: 7.8 mm; length: 300 mm) filled with "TSK 5000HLX", "TSK 4000HLX", "TSK-3000HLX" and "TSK 2000HLX", respectively, all produced by Toso Co., Ltd. As the eluant, there was used tetrahydrofuran.

The calibration curve was prepared using a standard polystyrene produced by Chemco Co., Ltd. (molecular weight: 761 (Mw/Mn≦1.14); 2000 (Mw/Mn≦1.20); 4000 (Mw/Mn≦1.06); 9000 (Mw/Mn≦1.04); 17500 (Mw/Mn≦1.03); 50000 (Mw/Mn≦1.03); 233000 (Mw/Mn≦1.05); 600000 (Mw/Mn≦1.05); and 900000 (Mw/Mn≦1.05))

In the measurement, Mw and Mn were determined in terms of polystyrene using a chart detected from refractive indices, and Mw/Mn was calculated from the Mw and Mn thus determined.

(4) Hue (YI):

First, the colored PC resin composition was dried at 120° C. for 5 hours, and then injection-molded at a cylinder set temperature of 280° C. to obtain a pressed sheet having a size of 100 mm×100 mm×3 mm in thickness. Next, the resultant pressed sheet was tested using a color tester "SC-1-CH" manufactured by Suga Shikenki Co., Ltd., to measure tristimulus values X, Y and Z thereof as absolute values of color thereof. From the thus measured values, an YI value as an index of yellowness was calculated from the following formula:

$$YI=(100/Y) \times (1.28 \times X - 1.06 \times Z).$$

The larger the YI value, the higher the degree of coloration of the sheet.

(5) Heat Resistance Test:

The colored PC resin composition was dried at 120° C. for 5 hours, and then molded at 360° C. for a residence time of 10 min to obtain a pressed sheet as a 10th shot having a size of 100 mm×100 mm×3 mm in thickness. Next, the resultant pressed sheet was tested using a color tester "SC-1-CH" manufactured by Suga Shikenki Co., Ltd., to measure tristimulus values X, Y and Z thereof as absolute values of color thereof. From the thus measured values, an YI value as an index of yellowness was calculated from the above formula.

(6) Hydrolysis Resistance Test:

As the test specimen, there was used the pressed sheet obtained in the above item (4). The test specimen was allowed to stand for 100 hours in an autoclave conditioned at 120° C. and 100% RH, to measure a change (Δ) in viscosity-average molecular weight thereof between before and after the standing test.

(7) Blow Moldability and Bottle Drop Test:

As the raw material, there were used pellets of the colored PC resin composition which were dried at 130° C. for 5 hours. The pellets were blow-molded using a molding machine "B-30" manufactured by Nippon Seikosho Co., Ltd., at a barrel temperature of 240 to 270° C. and a mold temperature of 70° C., to form a gallon bottle and evaluate a moldability thereof. Further, the thus obtained gallon bottle was fully cooled at room temperature and filled with water, and then dropped on an iron plate from a height of 1.8 m to examine whether or not any cracks were caused therein.

Example 1

Under a nitrogen gas atmosphere, diphenyl carbonate (DPC) and bisphenol A (BPA) were mixed with each other at a predetermine molar ratio (DPC/BPA=1.040) to prepare a raw melt solution. The raw melt solution was continuously fed at a flow rate of 96.7 kg/hour to a 200-L first vertical-type stirring polymerization vessel maintained at 220° C. and $1.33 \times 10^4$ Pa through a raw material feed pipe, and a liquid level in the polymerization vessel was kept constant while controlling an opening degree of a valve disposed on a polymer discharge line connected to a bottom of the polymerization vessel such that an average residence time in the polymerization vessel was 60 min. Further, simultaneously with initiation of feeding the raw melt solution, an aqueous cesium carbonate solution as a catalyst was continuously fed to the polymerization vessel in an amount of $1.0 \times 10^{-6}$ mole based on one mole of bisphenol A.

The polymerization reaction solution was discharged from the bottom of the first polymerization vessel, and then continuously fed to second and third vertical-type stirring polymerization vessels (each having a capacity of 200 L) and then to a fourth horizontal-type stirring polymerization vessel (having a capacity of 250 L), and withdrawn from a bottom of the fourth polymerization vessel through a polymer discharge port. The reaction conditions of the second to fourth polymerization vessels were as follows: 240° C., $2.00 \times 10^3$ Pa and 75 rpm for the second polymerization vessel; 270° C., 67 Pa and 75 rpm for the third polymerization vessel; and 285° C., 67 Pa and 5 rpm for the fourth polymerization vessel. With progress of the reaction, these reaction conditions were controlled to higher temperature, higher vacuum degree and lower stirring speed. In addition, during the reaction, the liquid levels in the second to fourth polymerization vessels were respectively controlled such that the average residence time in the respective polymerization vessels was 60 min, and phenol simultaneously by-produced was distilled out of the reaction system.

Next, the obtained molten polymer was directly fed into a twin-screw extruder, and continuously kneaded therein together with additives supplied through respective feed ports of the twin-screw extruder. The resultant kneaded material was extruded into strands through a die, and cut into pellets using a cutter.

That is, butyl p-toluenesulfonate was added (in an amount of 4 mole based on one mole of cesium carbonate used as the catalyst) to the extruder through the first additive feed port thereof.

Through the second additive feed port of the extruder, polyethyleneglycol "#400" (number-average molecular weight: 400) produced by Sanyo Kasei Co., Ltd., and phthalocyanine blue "Simitone Cyanine Blue LBGN-2 (Pigment Blue 15:3)" produced by Simika Color Co., Ltd., were added into the extruder in amounts of 0.02 part by weight and 0.001 part by weight, respectively, based on 100 parts by weight of the PC resin.

Through the third additive feed port of the extruder, tris(2,4-di-tert-butylphenyl)phosphite "AS2112" produced by Asahi Denka Kogyo Co., Ltd., was added into the extruder in an amount of 0.01 part by weight based on 100 parts by weight of the PC resin.

After the viscosity-average molecular weight of the composition was kept stable, the above procedure was continued for 100 hours. As a result, it was confirmed that the colored PC resin composition after 100 hours had a viscosity-average molecular weight of 22300. Also, the change in hue (YI) of the composition within 100 hours was measured. Further, properties of the colored PC resin composition after 100 hours were measured and evaluated. The production conditions of the PC resin composition as well as the measurement and evaluation results are shown in Tables 1 and 3.

Examples 2 and 3

The same procedure as defined in Example 1 was conducted except that the production conditions were changed to those shown in Table 1, thereby obtaining a colored PC resin composition, and measuring and evaluating properties thereof. The results are shown in Table 1.

Example 4

The same procedure as defined in Example 1 was conducted except that the amount of the polyethyleneglycol used was changed to 0.04 part by weight, thereby obtaining a colored PC resin composition, and measuring and evaluating properties thereof. The results are shown in Table 1.

Example 5

The same procedure as defined in Example 1 was conducted except that polypropyleneglycol "UNIOL D-2000" produced by Nippon Yushi Co., Ltd., was used in place of the polyethyleneglycol, thereby obtaining a colored PC resin composition, and measuring and evaluating properties thereof. The results are shown in Table 1.

Example 6

The same procedure as defined in Example 1 was conducted except that an anthraquinone-based dye "MACROLEX VIOLEX 3R" produced by Bayer AG., was used in place of the phthalocyanine blue, thereby obtaining a colored PC resin composition, and measuring and evaluating properties thereof. The results are shown in Table 1.

Example 7

The same procedure as defined in Example 1 was conducted except that 0.02 part by weight of ultramarine blue "No. 3000 (silicone-treated product)" produced by Daiichi Kasei Kogyo Co., Ltd., was used in place of 0.001 part by weight of phthalocyanine blue, thereby obtaining a colored PC resin composition, and measuring and evaluating properties thereof. The results are shown in Table 1.

Example 8

The same procedure as defined in Example 1 was conducted except that polyethyleneglycol "#400" (number-average molecular weight: 400) produced by Sanyo Kasei Co., Ltd., was added through the second additive feed port of the extruder in an amount of 0.02 part by weight based on 100 parts by weight of the PC resin, and phthalocyanine blue "Simitone Cyanine Blue LBGN-2 (Pigment Blue 15:3)" produced by Simika Color Co., Ltd., and tris(2,4-di-tert-butylphenyl)phosphite "AS2112" produced by Asahi Denka Kogyo Co., Ltd., were added through the third additive feed port of the extruder in amounts of 0.001 part by weight and 0.01 part by weight, respectively, based on 100 parts by weight of the PC resin, thereby obtaining a colored PC resin composition, and measuring and evaluating properties thereof. The results are shown in Table 1.

Comparative Example 1

The same procedure as defined in Example 1 was conducted except that glycerol produced by Nippon Yushi Co., Ltd., was used in place of the polyethyleneglycol, thereby obtaining a colored PC resin composition, and measuring and evaluating properties thereof. The results are shown in Table 2.

Comparative Example 2

The same procedure as defined in Example 1 was conducted except that distilled water was used in place of the polyethyleneglycol, thereby obtaining a colored PC resin composition, and measuring and evaluating properties thereof. The results are shown in Table 2.

Comparative Example 3

The same procedure as defined in Example 2 was conducted except that polypropyleneglycol distearate (number-average molecular weight: 2000) produced by Asahi Denka Kogyo Co., Ltd., was used in place of the polyethyleneglycol, thereby obtaining a colored PC resin composition, and measuring and evaluating properties thereof. The results are shown in Table 2.

Comparative Example 4

The same procedure as defined in Example 1 was conducted except that the production conditions were changed to those shown in Table 2, thereby obtaining a colored PC resin composition, and measuring and evaluating properties thereof. The results are shown in Table 2.

Comparative Example 5

The same procedure as defined in Example 1 was conducted except that 0.1 part by weight of PC resin particles "NOVALEX 7022PJ" produced by Mitsubishi Engineering Plastics Co., Ltd., was used in place of the polyethyleneglycol, thereby obtaining a colored PC resin composition, and measuring and evaluating properties thereof by the same method as defined in Example 2. The results are shown in Table 2.

Comparative Examples 6 and 7

The same procedure as defined in Example 1 was conducted except that the production conditions were changed to those shown in Table 2, thereby obtaining a colored PC resin composition, and measuring and evaluating properties thereof. The results are shown in Table 2.

TABLE 1

| | Examples | | | |
|---|---|---|---|---|
| | 1 | 2 | 3 | 4 |
| Catalyst | | | | |
| Kind | $Cs_2CO_3$ | $Cs_2CO_3$ | $Cs_2CO_3$ | $Cs_2CO_3$ |
| Concentration (μmol/BPA-mol) | 1.0 | 0.6 | 2.0 | 1.0 |
| Alkali metal concentration (μmol/BPA-mol) | 2.0 | 1.2 | 4.0 | 2.0 |
| First to fourth polymerization vessels (kind; concentration (μmol/BPA-mol); alkali metal concentration (μmol/BPA-mol)) | Refer to Table 3 | | | |
| Viscosity-average molecular weight (Mv) | 22300 | 18100 | 25700 | 22300 |
| Branching degree (mol %) | | | | |
| Constitutional unit of formula (2) (mol %) | 0.284 | 0.268 | 0.446 | 0.284 |
| Constitutional unit of formula (3) (mol %) | 0.084 | 0.068 | 0.142 | 0.084 |
| Constitutional unit of formula (4) (mol %) | 0.016 | 0.012 | 0.042 | 0.016 |
| Constitutional unit of formula (5) (mol %) | 0.016 | 0.012 | 0.042 | 0.016 |
| Total of branched constitutional units (mol %) | 0.400 | 0.360 | 0.672 | 0.400 |
| Mw/Mn | 3.20 | 2.85 | 3.40 | 3.20 |
| Dispersant | | | | |
| Kind | PEG | PEG | PEG | PEG |
| Amount added (wt part) | 0.02 | 0.02 | 0.02 | 0.04 |
| Colorant: kind: amount added (wt part) | A: 0.001 | A: 0.001 | A: 0.001 | A: 0.001 |
| Hue (YI) | −30 ± 0.5 | −30 ± 0.5 | −30 ± 0.7 | −30 ± 0.5 |
| Heat resistance (ΔYI) | 0.3 | 0.3 | 0.3 | 0.3 |
| Hydrolysis resistance (ΔMv) | 300 | 300 | 300 | 300 |
| Blow-moldability | Good | Good | Good | Good |
| Bottle drop test | Good | Good | Good | Good |

| | Examples | | | |
|---|---|---|---|---|
| | 5 | 6 | 7 | 8 |
| Catalyst | | | | |
| Kind | $Cs_2CO_3$ | $Cs_2CO_3$ | $Cs_2CO_3$ | $Cs_2CO_3$ |
| Concentration (μmol/BPA-mol) | 1.0 | 1.0 | 1.0 | 1.0 |
| Alkali metal concentration (μmol/BPA-mol) | 2.0 | 2.0 | 2.0 | 2.0 |
| First to fourth polymerization vessels (kind; concentration (μmol/BPA-mol); alkali metal concentration (μmol/BPA-mol)) | Refer to Table 3 | | | |
| Viscosity-average molecular weight (Mv) | 22300 | 22300 | 22300 | 22300 |
| Branching degree (mol %) | | | | |
| Constitutional unit of formula (2) (mol %) | 0.284 | 0.284 | 0.284 | 0.284 |
| Constitutional unit of formula (3) (mol %) | 0.084 | 0.084 | 0.084 | 0.084 |
| Constitutional unit of formula (4) (mol %) | 0.016 | 0.016 | 0.016 | 0.016 |
| Constitutional unit of formula (5) (mol %) | 0.016 | 0.016 | 0.016 | 0.016 |
| Total of branched constitutional units (mol %) | 0.400 | 0.400 | 0.400 | 0.400 |
| Mw/Mn | 3.20 | 3.20 | 3.20 | 3.20 |
| Dispersant | | | | |
| Kind | PPG | PEG | PEG | PEG |
| Amount added (wt part) | 0.02 | 0.02 | 0.02 | 0.02 |
| Colorant: kind: amount added (wt part) | A: 0.001 | B: 0.001 | C: 0.002 | A: 0.001 |
| Hue (YI) | −30 ± 0.5 | −10 ± 0.4 | −32 ± 0.5 | −30 ± 0.5 |
| Heat resistance (ΔYI) | 0.3 | 0.3 | 0.3 | 0.3 |
| Hydrolysis resistance (ΔMv) | 300 | 300 | 300 | 300 |
| Blow-moldability | Good | Good | Good | Good |
| Bottle drop test | Good | Good | Good | Good |

Note:
Colorant A: phthalocyanine blue,
Colorant B: anthraquinone-based dye,
Colorant C: ultramarine blue,
PEG: polyethylene glycol,
PPG: polypropyleneglycol

TABLE 2

| | Comparative Examples | | | |
|---|---|---|---|---|
| | 1 | 2 | 3 | 4 |
| Catalyst | | | | |
| Kind | $Cs_2CO_3$ | $Cs_2CO_3$ | $Cs_2CO_3$ | $Cs_2CO_3$ |
| Concentration (μmol/BPA-mol) | 1.0 | 1.0 | 1.0 | 0.4 |
| Alkali metal concentration (μmol/BPA-mol) | 2.0 | 2.0 | 2.0 | 0.8 |
| First to fourth polymerization vessels (kind; concentration (μmol/BPA-mol); alkali metal concentration (μmol/BPA-mol)) | Refer to Table 3 | | | |
| Viscosity-average molecular weight (Mv) | 22300 | 22300 | 22300 | 15000 |
| Branching degree (mol %) | | | | |
| Constitutional unit of formula (2) (mol %) | 0.284 | 0.284 | 0.284 | 0.220 |
| Constitutional unit of formula (3) (mol %) | 0.084 | 0.084 | 0.084 | 0.044 |
| Constitutional unit of formula (4) (mol %) | 0.016 | 0.016 | 0.016 | 0.008 |
| Constitutional unit of formula (5) (mol %) | 0.016 | 0.016 | 0.016 | 0.008 |
| Total of branched constitutional units (mol %) | 0.400 | 0.400 | 0.400 | 0.280 |
| Mw/Mn | 3.20 | 3.20 | 3.20 | 2.75 |
| Dispersant | | | | |
| Kind | GLY | Water | PPG distearate | PPG distearate |

TABLE 2-continued

| | | | | |
|---|---|---|---|---|
| Amount added (wt part) | 0.02 | 0.02 | 0.02 | 0.02 |
| Colorant: kind: amount added (wt part) | A: 0.001 | A: 0.001 | A: 0.001 | A: 0.001 |
| Hue (YI) | −30 ± 2.0 | −30 ± 2.8 | −30 ± 3.5 | −30 ± 1.4 |
| Heat resistance (ΔYI) | 2.0 | 2.5 | 4.5 | 4.5 |
| Hydrolysis resistance (ΔMv) | 2500 | 1800 | 800 | 800 |
| Blow-moldability | Good | Good | Good | Poor |
| Bottle drop test | Good | Good | Good | — |

| | Comparative Examples | | |
|---|---|---|---|
| | 5 | 6 | 7 |
| Catalyst | | | |
| Kind | $Cs_2CO_3$ | $Cs_2CO_3$ | $Cs_2CO_3$ |
| Concentration (μmol/BPA-mol) | 1.0 | 0.4 | 3.0 |
| Alkali metal concentration (μmol/BPA-mol) | 2.0 | 0.8 | 6.0 |
| First to fourth polymerization vessels (kind; concentration (μmol/BPA-mol); alkali metal concentration (μmol/BPA-mol)) | Refer to Table 3 | | |
| Viscosity-average molecular weight (Mv) | 22300 | 15000 | 25000 |
| Branching degree (mol %) | | | |
| Constitutional unit of formula (2) (mol %) | 0.284 | 0.220 | 0.510 |
| Constitutional unit of formula (3) (mol %) | 0.084 | 0.044 | 0.165 |
| Constitutional unit of formula (4) (mol %) | 0.016 | 0.008 | 0.288 |
| Constitutional unit of formula (5) (mol %) | 0.016 | 0.008 | 0.288 |
| Total of branched constitutional units (mol %) | 0.400 | 0.280 | 1.251 |
| Mw/Mn | 3.20 | 2.75 | 4.70 |
| Dispersant | | | |
| Kind | Powdery PC resin | PEG | PEG |
| Amount added (wt part) | 0.1 | 0.02 | 0.02 |
| Colorant: kind: amount added (wt part) | A: 0.001 | A: 0.001 | A: 0.001 |
| Hue (YI) | −30 ± 4.9 | −30 ± 0.2 | −24 ± 1.5 |
| Heat resistance (ΔYI) | 0.3 | 0.3 | 1.0 |
| Hydrolysis resistance (ΔMv) | 300 | 300 | 600 |
| Blow-moldability | Good | Poor | Poor |
| Bottle drop test | Good | — | — |

Note:
Colorant A: phthalocyanine blue,
GLY: glycerol,
PEG: polyethyleneglycol

TABLE 3

| | | Examples 1 to 8 and Comparative Examples 1 to 7 |
|---|---|---|
| First vertical-type stirring polymerization vessel | Temperature (° C.) | 220 |
| | Pressure (Pa) | $1.33 \times 10^4$ |
| | Residence time (min) | 60 |
| Second vertical-type stirring polymerization vessel | Temperature (° C.) | 240 |
| | Pressure (Pa) | $2.0 \times 10^3$ |
| | Residence time (min) | 60 |
| Third vertical-type stirring polymerization vessel | Temperature (° C.) | 270 |
| | Pressure (Pa) | 67 |
| | Residence time (min) | 60 |
| Fourth vertical-type stirring polymerization vessel | Temperature (° C.) | 285 |
| | Pressure (Pa) | 67 |
| | Residence time (min) | 60 |

What is claimed is:

1. A process for producing a colored aromatic polycarbonate resin composition comprising:
dispersing at least one colorant (b) selected from the group consisting of phthalocyanine-based compounds, anthraquinone-based compounds and ultramarine blue in a polyalkyleneglycol compound (c) having a number-average molecular weight of 62 to 4000 which is represented by the general formula (2):

$$HO-[-CHR^1-CHR^2-]_m-OH \quad (2)$$

wherein $R^1$, $R^2$, $R^3$ and $R^4$ are independently a hydrogen atom or an alkyl group, and m is a natural number of not less than 1; and adding the resultant dispersion to an aromatic polycarbonate resin (a) kept in a molten state, which aromatic polycarbonate resin (a) has a viscosity-average molecular weight of not less than 16000 and contains a branched constitutional unit in an amount of 0.3 to 0.95 mol % on the basis of a constitutional unit represented by the general formula (1):

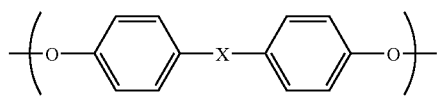
(1)

wherein X is a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, or a divalent connecting group selected from the group consisting of —O—, —S—, —CO—, —SO— and —SO$_2$—.

2. A process for producing a colored aromatic polycarbonate resin composition according to claim 1, wherein the branched constitutional unit in the aromatic polycarbonate resin (a) is any of constitutional units represented by the general formulae (3) to (6):

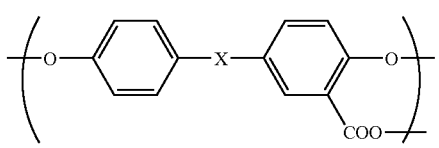
(3)

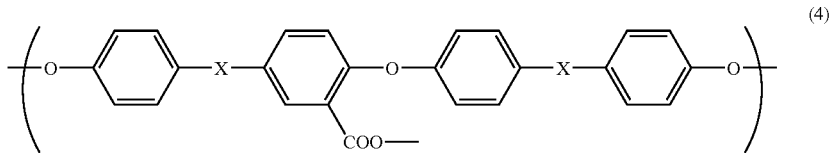

(4)

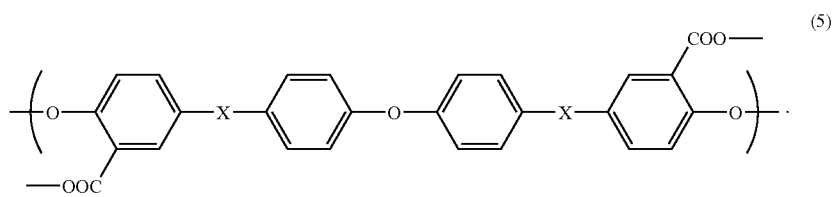

(5)

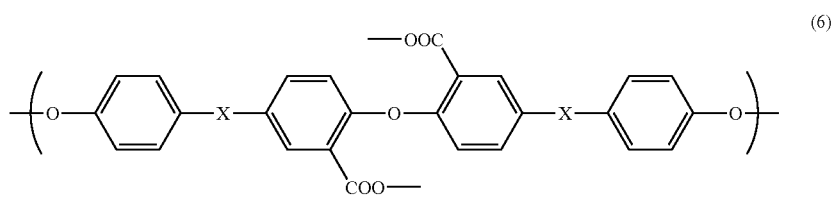

(6)

3. A process for producing a colored aromatic polycarbonate resin composition comprising dispersing at least one colorant (b) selected from the group consisting of phthalocyanine-based compounds, anthraquinone-based compounds and ultramarine blue in the polyalkyleneglycol compound (c) having a number-average molecular weight of 62 to 4000 which is represented by the general formula (2):

$$HO\text{—}[\text{—}CHR^1\text{—}CHR^2\text{—}]_m\text{—}OH \quad (2)$$

wherein $R^1$, $R^2$, $R^3$ and $R^4$ are independently a hydrogen atom or an alkyl group, and m is a natural number of not less than 1; and adding the resultant dispersion to an aromatic polycarbonate resin (a) kept in a molten state, which aromatic polycarbonate resin (a) has a viscosity-average molecular weight of not less than 16000 and contains a branched constitutional unit in an amount of 0.3 to 0.95 mol % on the basis of a constitutional unit represented by the following formula (9), when being subjected to high-pressure liquid chromatography, after alkali hydrolysis:

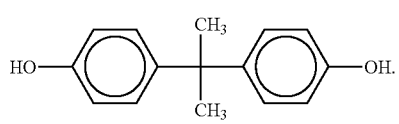 (9)

4. A process for producing a colored aromatic polycarbonate resin composition according to claim 3, wherein a detected compound when the aromatic polycarbonate resin (a) is subjected to high-pressure liquid chromatography, after alkali hydrolysis, is any of the compounds represented by the general formulae (10) to (13):

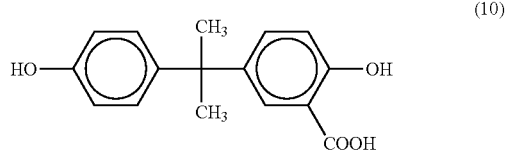 (10)

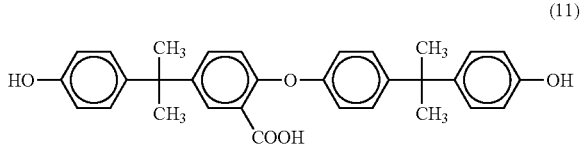 (11)

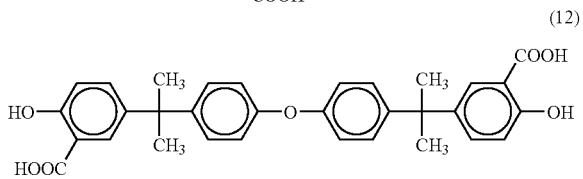 (12)

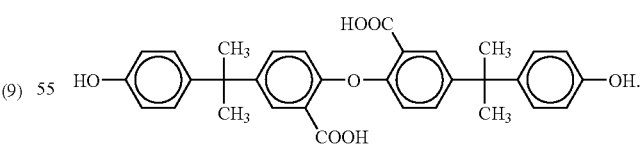 (13)

5. A process for producing a colored aromatic polycarbonate resin composition according to claim 1, wherein the aromatic polycarbonate resin (a) has a viscosity-average molecular weight of not less than 20000.

6. A process for producing a colored aromatic polycarbonate resin composition according to claim 3, wherein the aromatic polycarbonate resin (a) has a viscosity-average molecular weight of not less than 20000.

7. A process for producing a colored aromatic polycarbonate resin composition according to claim 1, wherein the colored aromatic polycarbonate resin composition further contains a heat stabilizer (d) in an amount of 0.0001 to 0.5 part by weight based on 100 parts by weight of the aromatic polycarbonate resin (a).

8. A process for producing a colored aromatic polycarbonate resin composition according to claim 3, wherein the colored aromatic polycarbonate resin composition further contains a heat stabilizer (d) in an amount of 0.0001 to 0.5 part by weight based on 100 parts by weight of the aromatic polycarbonate resin (a).

\* \* \* \* \*